(12) United States Patent
Yamaguchi

(10) Patent No.: US 7,712,654 B2
(45) Date of Patent: May 11, 2010

(54) GOODS SUPPLY SYSTEM

(75) Inventor: Kazuyuki Yamaguchi, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 506 days.

(21) Appl. No.: 11/731,120

(22) Filed: Mar. 29, 2007

(65) Prior Publication Data

US 2007/0228142 A1 Oct. 4, 2007

(30) Foreign Application Priority Data

Mar. 30, 2006 (JP) .......................... P2006-093971

(51) Int. Cl.
*G06F 7/00* (2006.01)

(52) U.S. Cl. ..................... 235/376; 235/385

(58) Field of Classification Search ............ None
See application file for complete search history.

(56) References Cited

U.S. PATENT DOCUMENTS 5,091,855 A * 2/1992 Umehara et al. ............. 701/23

| | | | |
|---|---|---|---|
| 6,705,523 B1 * | 3/2004 | Stamm et al. | 235/385 |
| 2004/0084520 A1 * | 5/2004 | Muehl et al. | 235/376 |
| 2005/0113949 A1 * | 5/2005 | Honda | 700/95 |
| 2007/0225906 A1 * | 9/2007 | Ikeda | 701/208 |

FOREIGN PATENT DOCUMENTS

JP 2005-190120 7/2005

* cited by examiner

*Primary Examiner*—Seung H Lee
*Assistant Examiner*—Christle I Marshall
(74) *Attorney, Agent, or Firm*—Locke Lord Bissell & Liddell LLP

(57) ABSTRACT

A goods supply system that retrieves parts for making up a product from goods storage locations in a supply area and supplies them to an assembly line, which comprises: a storage means that registers key information on the product and parts information including information on types and storage locations of the parts in advance; a first in-process card issuing machine that writes the key information on the product into a first in-process card; and a retrieving unit having a means that reads out the key information written in the first in-process card, collates the key information with the key information and the parts information registered in the storage means, and retrieves the parts corresponding to the key information from the goods storage locations.

6 Claims, 13 Drawing Sheets

4: IN-PROCESS CARD ISSUING MACHINE
6: IN-PROCESS CARD ISSUING MACHINE
9: IN-PROCESS CARD
10: IN-PROCESS CARD

FIG. 2A

| CONTROL NUMBER | VEHICLE TYPE | PARTS | ASSEMBLY LINE |
|---|---|---|---|
| 001 | VEHICLE X | a,b,c | A LINE |
| 002 | VEHICLE Y | b,d,e | B LINE |
| 003 | VEHICLE Y | b,d,e | B LINE |
| 004 | VEHICLE Y | b,d,f | B LINE |
| 005 | VEHICLE X | a,b,g | A LINE |
| ... | | | |
| 999 | VEHICLE X | a,b,c | A LINE |
| 001 | VEHICLE X | a,b,g | A LINE |
| 002 | VEHICLE Z | h,I,j | A LINE |
| ... | | | |

FIG. 2B

| PARTS | PARTS RACK LOCATION |
|---|---|
| a | ADDRESS a |
| b | ADDRESS b |
| c | ADDRESS c |
| d | ADDRESS d |
| e | ADDRESS e |
| f | ADDRESS f |
| ... | |

FIG. 2C

| CONTENTS | CONTROL NUMBER | VEHICLE TYPE | PARTS | ASSEMBLY LINE | PARTS RACK LOCATION |
|---|---|---|---|---|---|
| PARTS RETRIEVING IN-PROCESS CARD 9 | ○ | | | | |
| CARRYING IN-PROCESS CARD 10 | ○ | | | ○ | |
| DATA OF DATABASE 23 | ○ | | ○ | | |
| DATA OF DATABASE 24 | | | ○ | | ○ |

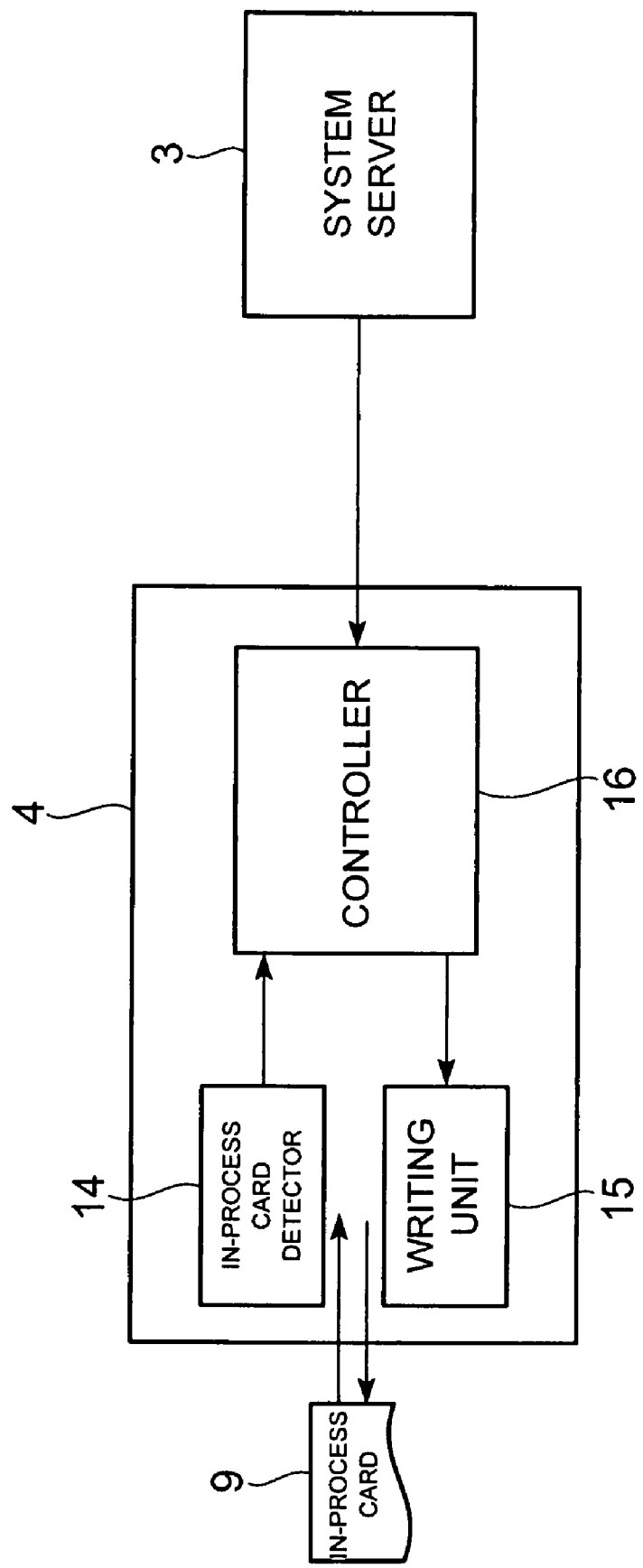

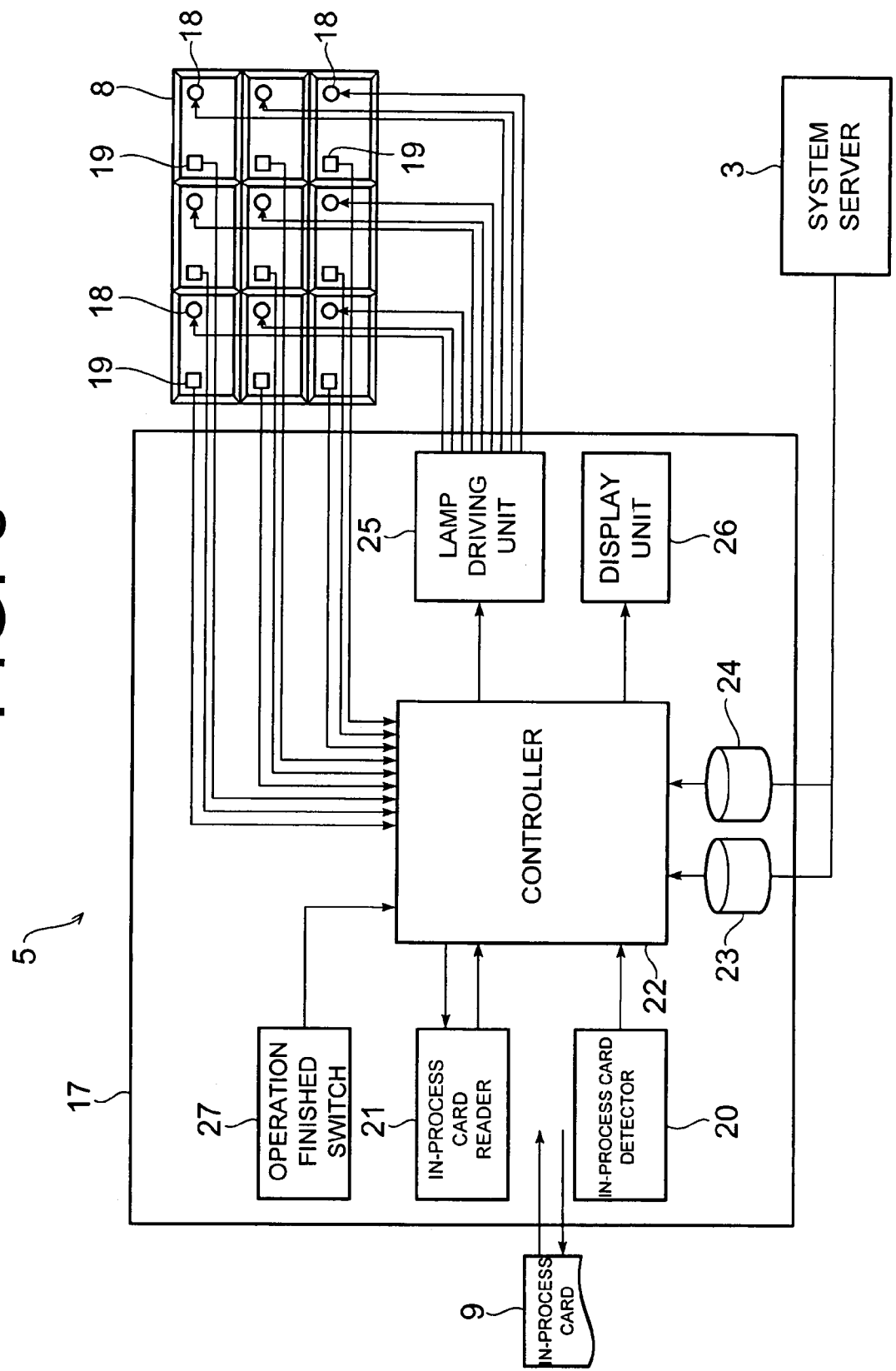

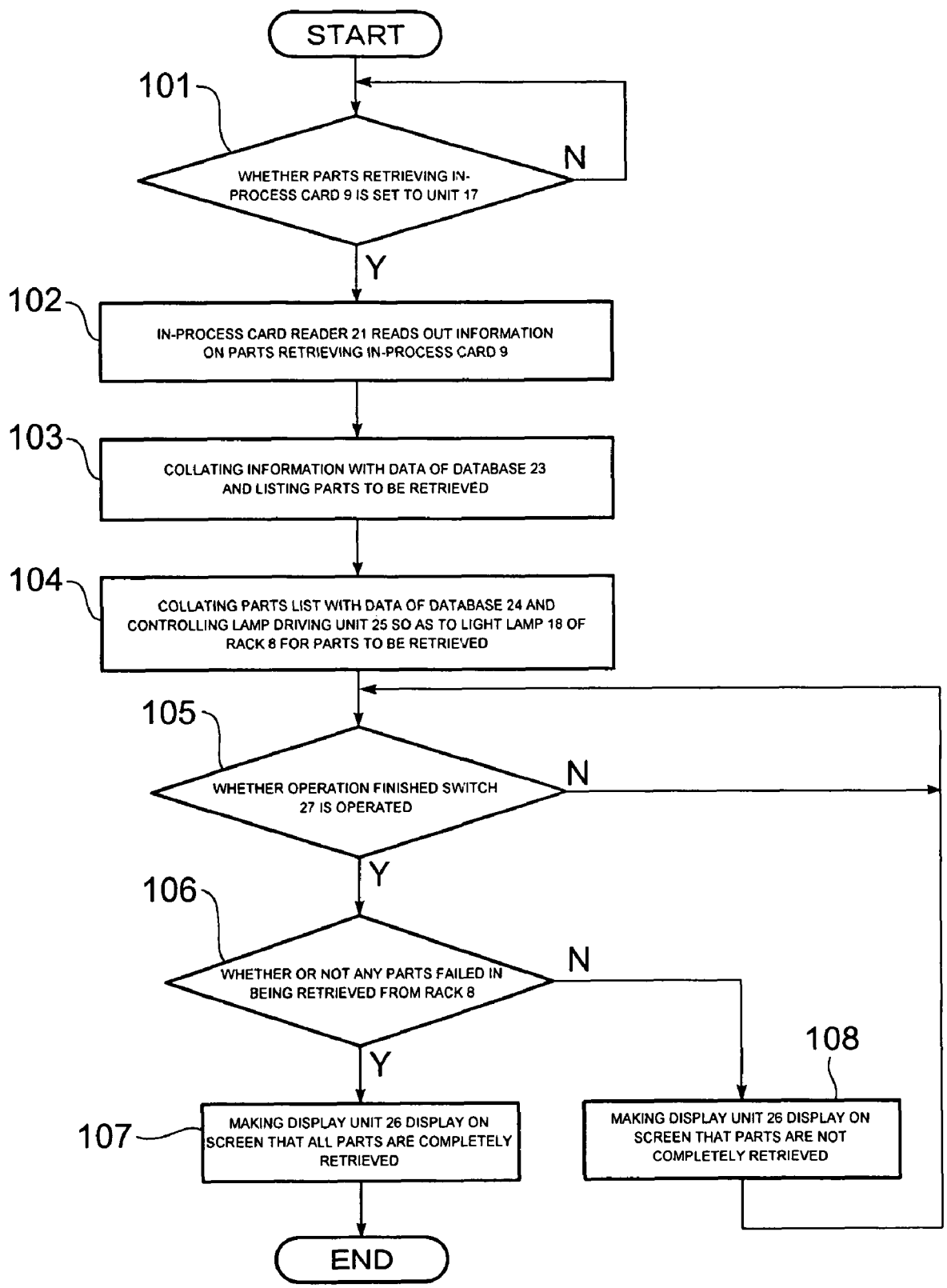

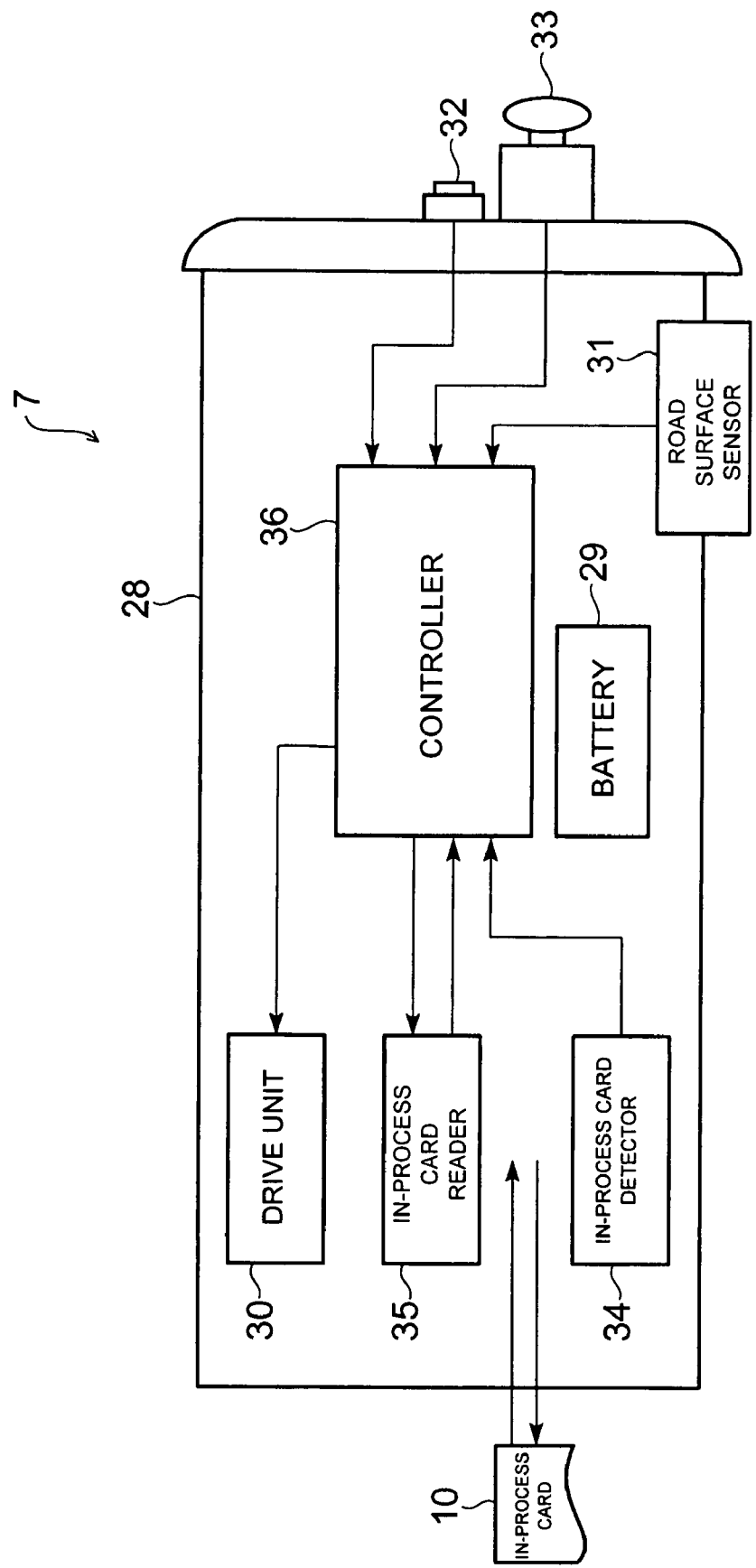

GOODS SUPPLY SYSTEM

BACKGROUND OF THE INVENTION

The present invention relates to a goods supply system. The goods supply system may, for example, supply goods to a predetermined place in a production site of a product.

A goods supply system that supplies goods may use the operation instruction control system disclosed in Japanese Patent Application Publication No. 2005-190, for example. In the operation instruction control system disclosed in this document, first, a production control CPU delivers operation instruction information by processes. Next, an ID tag writing device receives the operation instruction information by processes and writes the information into ID tags. Then, the ID tag with the operation instruction information by processes written is applied to the goods to be operated, and the goods to be operated are conveyed to operation areas by processes.

However, supplying parts by using the above conventional technique will require writing a massive amount of operational instruction information, such as types of products, types and quantities of parts, and the like, into an ID tag. Therefore, if there is a limitation on the storage capacity for the ID tag, information other than the operation instruction information (e.g., control information or the like) cannot be written into the ID tag, which leads to a problem such that the other processes using the ID tag concerned cannot be performed.

The present invention is directed to a goods supply system capable of supplying necessary goods to a predetermined place with a minimum quantity of information written in an information recording medium.

SUMMARY OF THE INVENTION

A first aspect of the present invention provides a goods supply system that retrieves parts for making up a product from goods storage locations in a supply area and supplies them to an assembly line, which includes: a storage means that registers key information on the product and parts information including information on types and storage locations of the parts in advance; a first in-process card issuing machine that writes the key information on the product into a first in-process card; and a retrieving unit having a means that reads out the key information written in the first in-process card, collates the key information with the key information and the parts information registered in the storage means, and retrieves the parts corresponding to the key information from the goods storage locations.

A second aspect of the present invention provides a goods supply system that retrieves goods from goods storage locations in a supply area and supplies them to a carriage destination, which includes: a storage means that registers key information on the goods and goods information including information on types and storage locations of the goods in advance; a first in-process card issuing machine that writes the key information on the goods into a first rewritable in-process card; a second in-process card issuing machine that writes the key information and carriage destination information on the goods into a second rewritable in-process card; a retrieving unit having a means that reads out the key information written in the first in-process card, collates the key information with the key information and the goods information registered in the storage means, and retrieves the goods corresponding to the key information from the goods storage locations; a carrier that carries the goods retrieved from the goods storage locations to the carriage destination; and a carrier control means that reads out the key information and the carriage destination information written in the second in-process card, and when the key information written in the first in-process card conforms to the key information written in the second in-process card, moves the carrier to the carriage destination corresponding to the carriage destination information.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

FIGS. 2A, 2B and 2C are lists illustrating the information on the product produced by using the goods supply system of FIG. 1;

FIG. 4 illustrates a construction of the in-process card issuing machine of FIG. 1;

FIG. 5 illustrates a construction of the parts retrieving unit of FIG. 1;

FIG. 6 is a flow chart illustrating the details of processing steps by the controller of FIG. 5;

FIG. 7 illustrates a construction of the automated guided vehicle of FIG. 1;

DETAILED DESCRIPTION OF THE PREFERRED EMBODIMENTS

The following will describe preferred embodiments of the goods supply system relating to the present invention in detail with reference to the appended drawings.

Figure 1:
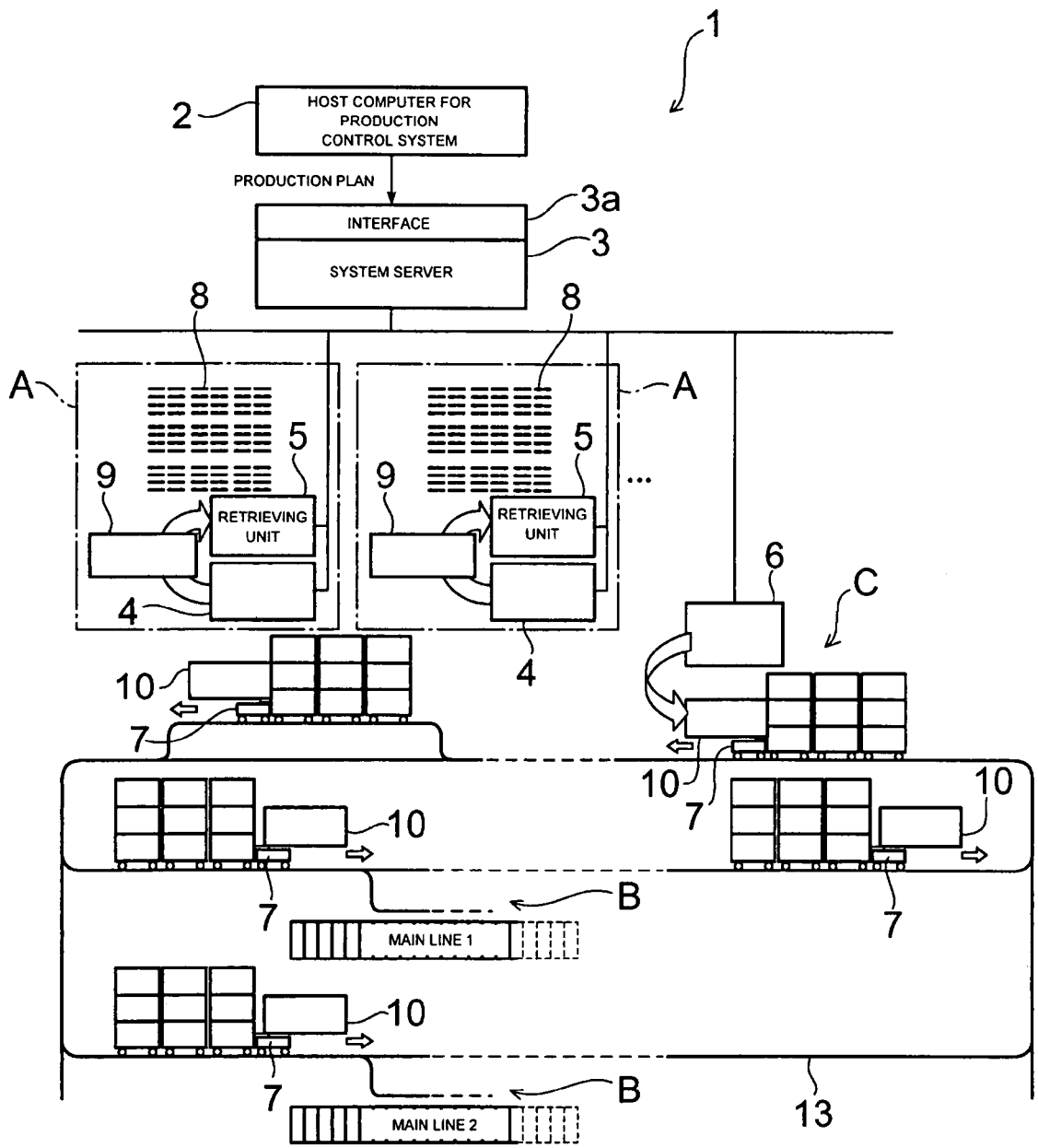
FIG. 1 is a schematic diagram illustrating one embodiment of the goods supply system relating to the present invention.

FIG. 1 is a schematic diagram illustrating one embodiment of the goods supply system relating to the present invention. In the drawing, a goods supply system 1 of this embodiment is an in-process system that supplies parts for making up a vehicle from a supply area A to an assembly line B, when producing multiple models of vehicles in a factory, for example.

The goods supply system 1 includes a host computer 2 for a production control system, a system server 3 connected through an interface 3a, a plurality of in-process card issuing machines 4 and a plurality of retrieving units 5 connected to the system server 3, an in-process card issuing machine 6 connected to the system server 3, and a plurality of automated guided vehicles (AGV) 7.

The host computer 2 transmits operation instruction information and so forth based on a production plan to the system server 3. On the basis of the operation instruction information transmitted from the host computer 2, the system server 3 transmits various information on products (vehicles) to the in-process card issuing machines 4, 6 and the retrieving units 5. Here, the operation instruction information includes the number to be retrieved, location to be retrieved, destination to be stored, model, parts number, type, operation condition, process condition, etc.

Here, the information on vehicles includes control number, vehicle type, parts corresponding to vehicle type, assembly line corresponding to vehicle type, parts rack locations wherein parts are stored, and so forth, as shown in FIGS. 2A and 2B. The control number is a representative number being the key information on vehicles; for example, it uses 001 to 999 in order, and returns to 001 after 999. The order of the control number is the assembly order of vehicles.

The in-process card issuing machines 4 and the retrieving units 5 are located in the supply areas A. The supply areas A have racks 8 (each serving as a parts storing unit) installed, which store various parts for making up vehicles. There are multiple supply areas A corresponding to vehicle types. Each one of the racks 8, the in-process card issuing machines 4, and the retrieving units 5 is located in each of the supply areas A. The in-process card issuing machine 6 is located at an in-process card issuing position in a standby area C where the automated guided vehicles 7 not involved in operations stay on standby.

The in-process card issuing machine 4 is a device that writes information into a parts retrieving in-process card 9. The information written in the parts retrieving in-process card 9 is the control number information only, as shown in FIG. 2C. The retrieving unit 5 is a unit that controls to retrieve the parts for vehicle types corresponding to the control number information written in the parts retrieving in-process card 9 from the rack 8. The in-process card issuing machine 6 is a device that writes information into a carrying in-process card 10. The information written in the carrying in-process card 10 is the control number information and the assembly line information, as shown in FIG. 2C. Here, the information (identification information) written in the parts retrieving in-process card 9 and the carrying in-process card 10 include information on the supply area, number of times of writing, card ID, and so forth.

Figure 3A:
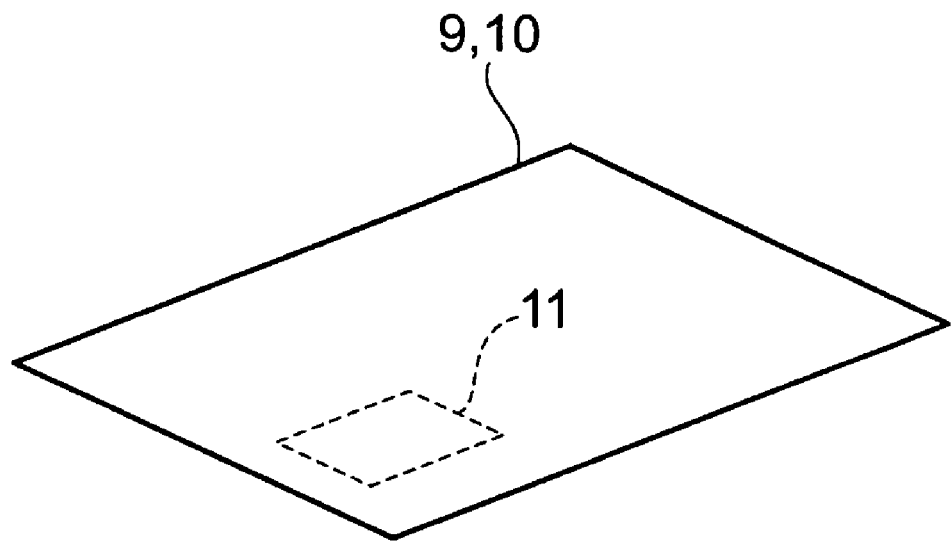
FIGS. 3A and 3B are schematic diagrams illustrating the parts retrieving in-process card and the carrying in-process card of FIG. 1.
Figure 3B:
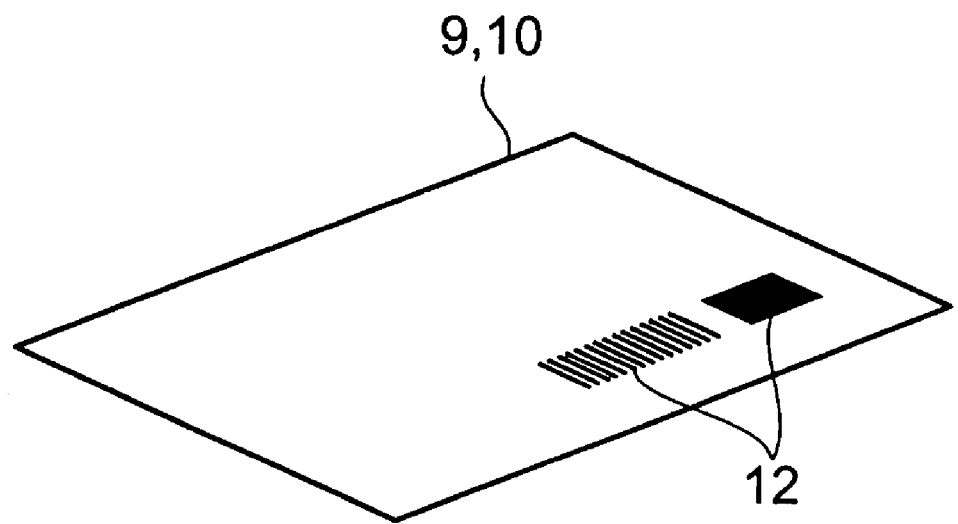

The parts retrieving in-process card 9 and the carrying in-process card 10 are recording media that record the above information as digital data. The method of recording the information into these in-process cards 9, 10 preferably uses an IC chip 11 as shown in FIG. 3A, or a bar code 12 as shown in FIG. 3B. The IC chip 11 is capable of easily rewriting data. The bar code 12 is capable of rewriting data by means of the leuco-type printing. Therefore, the reuse of the in-process cards 9, 10 becomes possible, which makes it unnecessary to prepare a large number of the in-process cards 9, 10, thus leading to effective use of resources. Further, the power consumption for display becomes unnecessary, which serves energy saving. Here, the method of recording the information into the in-process cards 9, can possibly apply an ID tag, magnetic tape, magnetic card, QR code, recording disk (CD, HD, FD, etc.), and so forth, other than the IC chip 11 and the bar code 12.

The automated guided vehicle 7 is a parts carrier that automatically moves along a fixed travel course 13, and carries the parts retrieved from the rack 8 in the supply area A to the assembly line B written in the carrying in-process card 10. The travel course 13 is formed such that the automated guided vehicle 7 moves from the standby area C to a plurality of the assembly lines B by way of a plurality of the supply areas A, and the automated guided vehicle 7 returns to the standby area C from each of the assembly lines B. Putting the automated guided vehicles 7 being not used for operations on standby in the standby area C will avoid traffic jamming by the automated guided vehicles 7. Here, the travel course 13 is formed by a magnetic tape and so forth applied on the floor of a factory, as an example.

FIG. 4 illustrates a construction of the in-process card issuing machine 4. In the drawing, the in-process card issuing machine 4 has an in-process card detector (contact switch, for example) 14 that detects whether the parts retrieving in-process card 9 is thrown into a slot of the in-process card issuing machine 4, a writing unit 15 that writes information into the parts retrieving in-process card 9, and a controller 16. When the in-process card detector 14 detects that the parts retrieving in-process card 9 is thrown into the slot of the in-process card issuing machine 4, the controller 16 controls the writing unit 15 to write the information (control number) transmitted from the system server 3 into the parts retrieving in-process card 9.

The in-process card issuing machine 6 has, in the same manner as the in-process card issuing machine 4, the in-process card detector 14, the writing unit 15, and the controller 16, which are not especially illustrated. When the carrying in-process card 10 is thrown into the slot of the in-process card issuing machine 6, the information (control number and assembly line) transmitted from the system server 3 is written into the carrying in-process card 10.

Here, the transmission of information to the in-process card issuing machines 4, 6 from the system server 3 is performed simultaneously by each control number, for example. In this stage, it is not especially judged whether the information in the parts retrieving in-process card 9 and the carrying in-process card 10 should be rewritten.

FIG. 5 illustrates a construction of the retrieving unit 5. In the drawing, the retrieving unit 5 has a unit 17, lamps (LED, for example) 18 each equipped on each rack of the rack 8, and retrieving completion switches 19. The lamps 18 are equipped on each rack of the rack 8 by plural number, so that the number of parts to be retrieved can be found, for example. The retrieving completion switches 19 are operated by an operator, when the retrieving of parts is completed from one rack of the rack 8; and they are equipped one by one on each rack of the rack 8.

The unit 17 possesses an in-process card detector 20, an in-process card reader 21, a controller 22, databases 23, 24, a lamp driving unit 25, a display unit 26, and an operation finished switch 27.

The in-process card detector 20 is a sensor (contact switch, for example) that detects whether the parts retrieving in-process card 9 is set to the unit 17. The in-process card reader 21 reads the information written in the parts retrieving in-process card 9, when the parts retrieving in-process card 9 is set to the unit 17.

The controller 22 inputs the information (control number) read by the in-process card reader 21, performs a predetermined processing, controls the lamp driving unit 25, and makes the display unit 26 display the processing result. The processing executed by the controller 22 will be detailed later.

In the database 23, registered information (control number, parts list, assembly line) is transmitted from the system server 3. The information registered in the database 23 is updated and registered, before the information written in the in-process cards 9, 10 is transmitted to the in-process card issuing machines 4, 6 each from the system server 3. For example, before starting the production of a product, the information for the production of the day is updated and registered as a unit/group in the database 23.

In the database 24, registered information (parts, parts racks locations) is transmitted from the system server 3. The information registered in the database 24 is not updated, as long as the layout of parts storage in the rack 8 is not changed.

The lamp driving unit 25 lights or flickers the lamps 18 equipped on each rack of the rack 8. The display unit 26 displays on the screen thereof whether any parts failed to be retrieved from the rack 8, and the quantities of the parts to be retrieved from each rack of the rack 8 and the like. The operation finished switch 27 is operated by an operator, when the whole retrieving of parts is completed.

FIG. 6 is a flow chart illustrating the details of processing steps by the controller 22. In the drawing, first, the step 101 judges from an output signal of the in-process card detector 20 whether the parts retrieving in-process card 9 is set to the unit 17. When the parts retrieving in-process card 9 is set to the unit 17, the step 102 controls the in-process card reader 21 to read out the control number information written in the parts retrieving in-process card 9, and inputs the control number information read out by the in-process card reader 21.

The step 103 collates the control number information read out with the information (control number, parts list) registered in the database 23, and lists the parts corresponding to the control number concerned. The step 104 collates the parts list with the information (parts, parts racks locations) registered in the database 24, and controls the lamp driving unit 25 so as to light or flicker the lamp 18 of the rack on which the parts corresponding to the control number are stored. Here, the information which is collated with the information (identification information) read out from the parts retrieving in-process card 9 and the carrying in-process card 10 is collation information, which includes information such as supply areas, number of times of writing, card ID, etc., in correspondence with the identification information.

Thereafter, the step 105 judges whether the operation finished switch 27 is operated; and when the operation finished switch 27 is operated, the step 106 judges whether or not any parts are failed in being retrieved from the rack 8, on the basis of the information of listed parts and an output and so forth from the retrieving completion switches 19. Then, when no parts failed to be retrieved from the rack 8, the step 107 makes the display unit 26 display on the screen that all parts are completely retrieved (parts retrieving: OK). On the other hand, when some parts failed to be retrieved from the rack 8, the step 108 makes the display unit 26 display on the screen that the parts are not completely retrieved (parts retrieving: NG). Thereafter, the processing returns to the step 105.

In the above retrieving unit 5, the databases 23, 24 constitute a storage means that registers the key information on products and the parts information including information on types and storage locations of parts in advance.

The above steps 101 through 104 by the in-process card detector 20, the in-process card reader 21, and the controller 22 and the lamp driving unit 25 constitute a control means to read out the key information written in the parts retrieving in-process card 9, collate the key information concerned with the key information and parts information registered in the databases 23, 24, and retrieve the parts corresponding to the key information from the rack 8.

FIG. 7 illustrates a construction of the automated guided vehicle 7. In the drawing, the automated guided vehicle 7 possesses a vehicle body 28, a battery 29 being a power supply mainly for the vehicle body 28 to automatically travel, a drive unit 30 including a motor to drive the vehicle body 28, a road surface sensor 31 that detects magnetic tapes and so forth forming the travel course 13, a start switch 32 (serving as a start instruction means) to instruct starting the vehicle body 28, a stop switch 33 to instruct forcibly stopping the vehicle body 28, an in-process card detector 34, an in-process card reader 35, and a controller 36.

The in-process card detector 34 is a sensor (contact switch, for example) that detects whether the carrying in-process card 10 is set to the automated guided vehicle 7. The in-process card reader 35 reads the information written in the carrying in-process card 10, when the carrying in-process card 10 is set to the automated guided vehicle 7.

Figure 8:
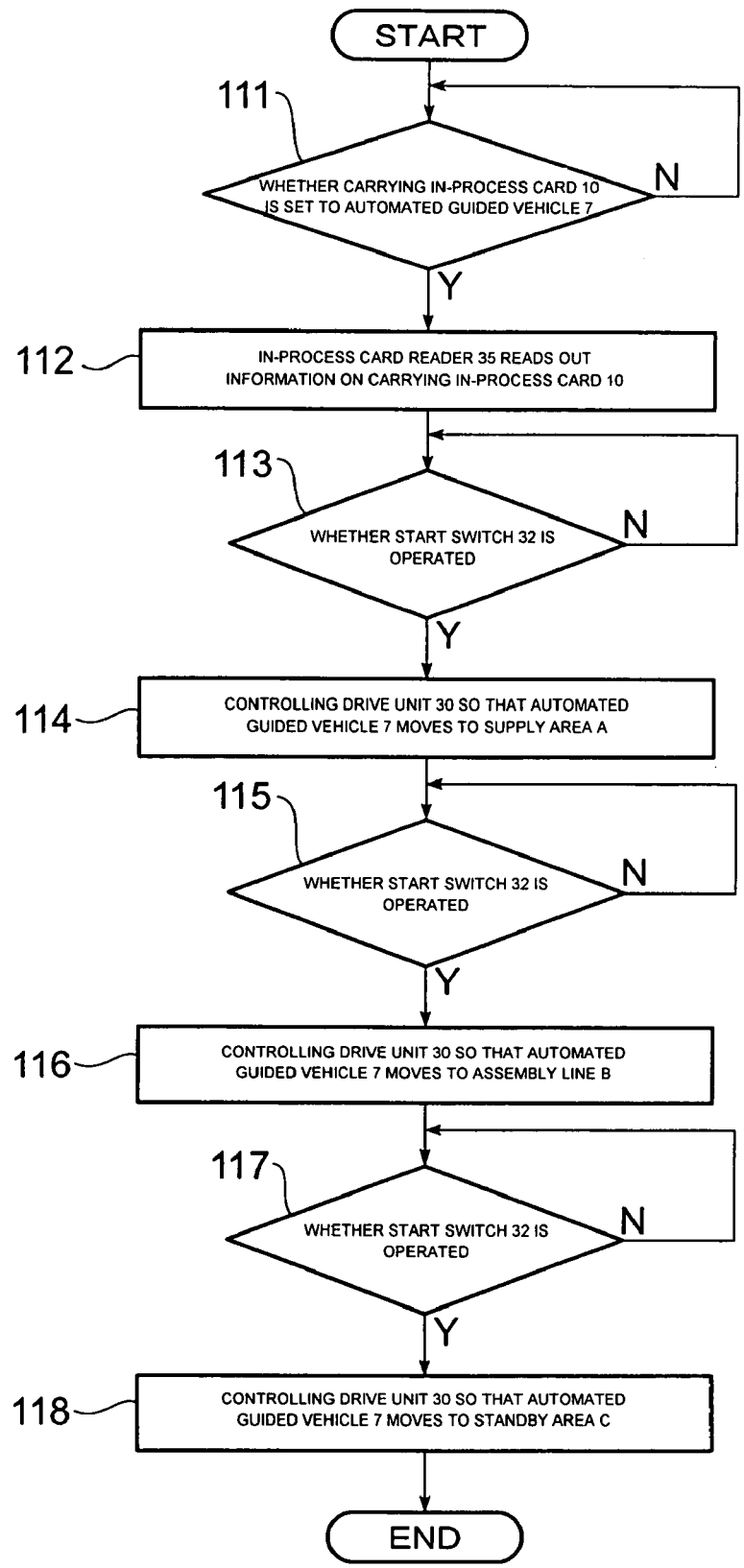
FIG. 8 is a flow chart illustrating the details of the processing steps by the controller of FIG. 7.

The controller 36 inputs the information (control number and assembly line) and so forth read by the in-process card reader 35, performs a predetermined processing, and controls the drive unit 30. FIG. 8 illustrates the details of the processing steps by the controller 36.

In the drawing, first, the step 111 judges whether the carrying in-process card 10 is set to the automated guided vehicle 7. Then, when the carrying in-process card 10 is set to the automated guided vehicle 7, the step 112 controls the in-process card reader 35 to read out the information on the control number and the assembly line written in the carrying in-process card 10, and inputs the information on the control number and the assembly line read out by the in-process card reader 35.

Thereafter, the step 113 judges whether the start switch 32 of the automated guided vehicle 7 is operated; and when the start switch 32 is operated, the step 114 controls the drive unit 30 so that the vehicle body 28 moves to the supply area A corresponding to the assembly line information from the in-process card issuing position in the standby area C.

Thereafter, the step 115 judges whether the start switch 32 is operated; and when the start switch 32 is operated, the step 116 controls the drive unit 30 so that the vehicle body 28 moves to the assembly line B corresponding to the assembly line information from the supply area A.

Thereafter, the step 117 judges whether the start switch 32 is operated; and when the start switch 32 is operated, the step 118 controls the drive unit 30 so that the vehicle body 28 moves to the standby area C from the assembly line B.

In the above automated guided vehicle 7, the steps 111 through 116 by the drive unit 30, the in-process card detector 34, the in-process card reader 35, and the controller 36 constitute a carrier control means that reads out the key information and the assembly line information written in the carrying in-process card 10, and when the key information written in the parts retrieving in-process card 9 conforms to the key information written in the carrying in-process card 10, moves the automated guided vehicle 7 to the assembly line B corresponding to the assembly line information.

Figure 9:
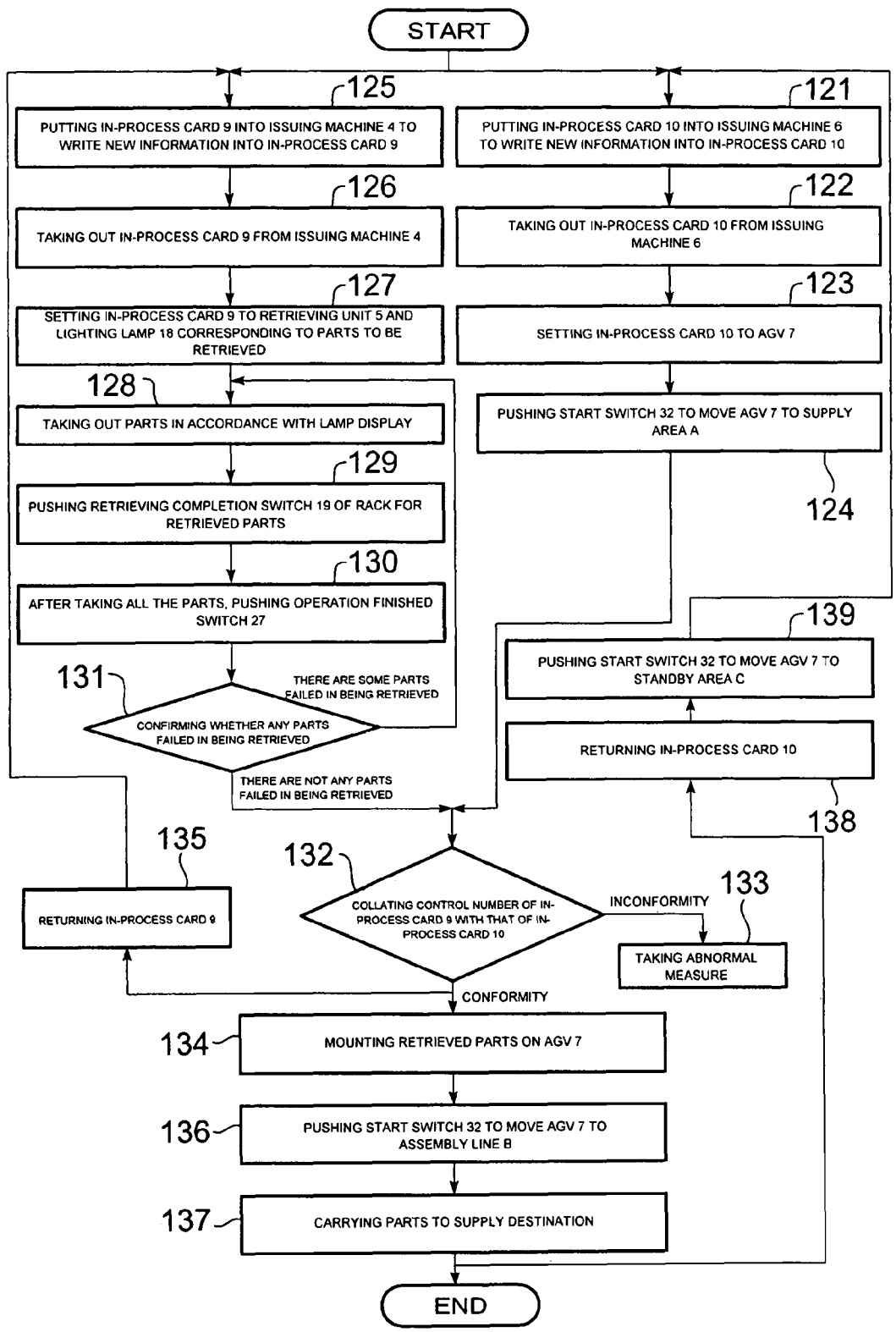
FIG. 9 is a flow chart illustrating the flow of parts supplying operation by using the goods supply system of FIG. 1.
Figure 10:
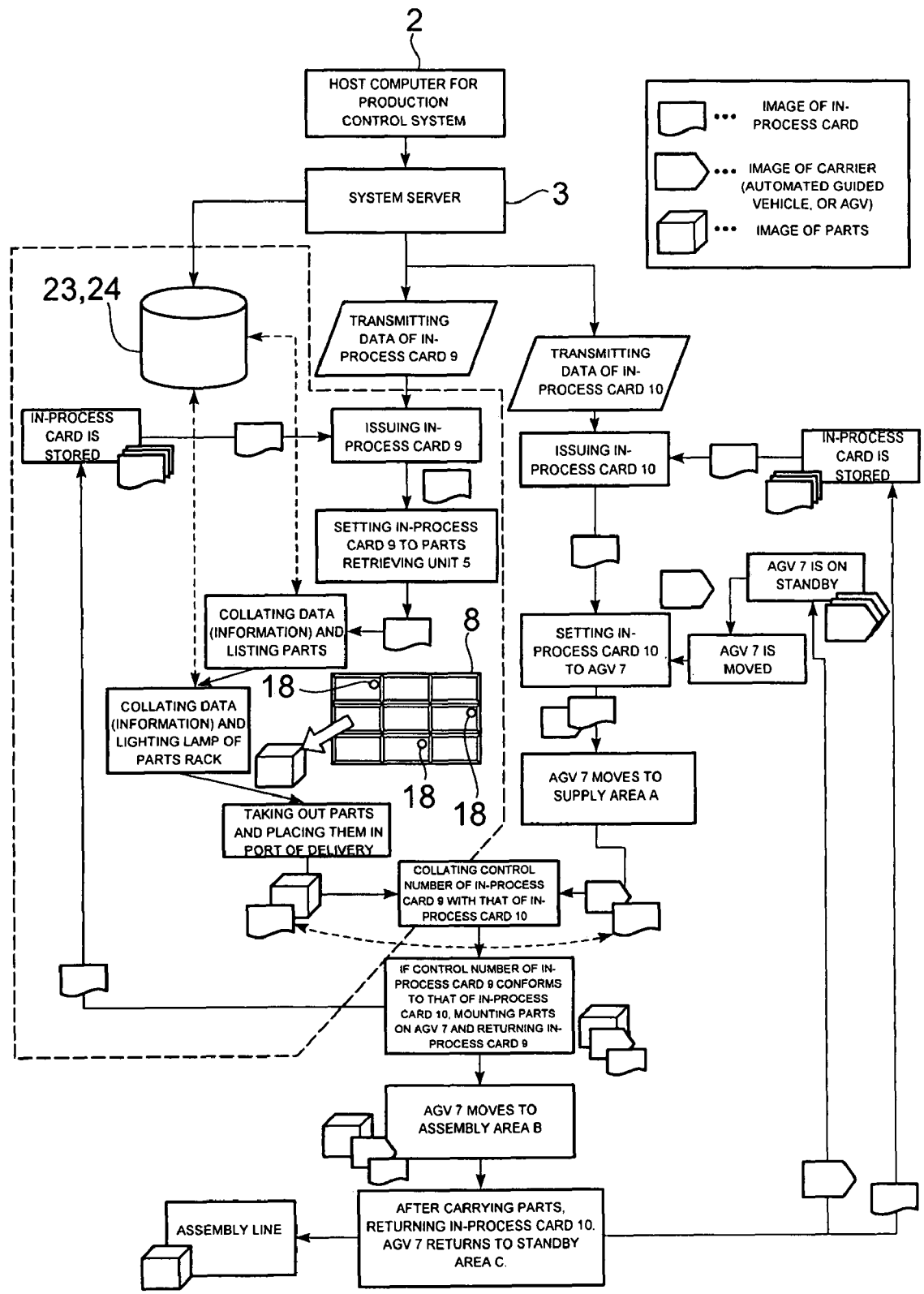
FIG. 10 is a conceptual chart illustrating the flow of parts supplying operation by using the goods supply system of FIG. 1.

Next, the operation to supply parts necessary for the assembly of a product (vehicle) to the assembly line B by using the above goods supply system 1 will be described with reference to FIGS. 9 and 10. FIG. 9 is a flow chart illustrating the flow of parts supplying operation, and FIG. 10 is a conceptual chart illustrating the flow of parts supplying operation.

In each of the drawings, after an operator who performs an operation in the standby area C (hereafter, standby operator)

moves the automated guided vehicle 7 on standby to the in-process card issuing position, the operator puts the carrying in-process card 10 stored in an in-process card storage place in the in-process card issuing machine 6. Then, new information (control number and assembly line) is written in the carrying in-process card 10 concerned (step 121 in FIG. 9).

Next, after taking out the carrying in-process card 10 having the new information written from the in-process card issuing machine 6 (step 122), the standby operator sets the carrying in-process card 10 concerned to the automated guided vehicle 7 (step 123). Then, by the processing at the steps 111, 112 illustrated in FIG. 8, the information written in the carrying in-process card 10 concerned is read out, and the supply area A corresponding to the assembly line information is determined. Then, as the standby operator pushes the start switch 32 of the automated guided vehicle 7, by the processing at the steps 113, 114 illustrated in FIG. 8, the automated guided vehicle 7 automatically moves from the in-process card issuing position to a port of parts delivery in the supply area A corresponding to the assembly line information (step 124).

Along with the above operation by the standby operator, an operator who performs an operation in the supply area A (hereafter, parts supply operator) puts the parts retrieving in-process card 9 stored in the in-process card storage place in the in-process card issuing machine 4. Then, new information (control number) is written in the parts retrieving in-process card 9 concerned (step 125).

Next, after taking out the parts retrieving in-process card 9 having the new information written from the in-process card issuing machine 4 (step 126), the parts supply operator sets the parts retrieving in-process card 9 concerned to the unit 17 of the retrieving unit 5. Then, by the processing at the steps 101 through 104 illustrated in FIG. 6, the information written in the parts retrieving in-process card 9 is read out, the types and quantities of the parts corresponding to the control number information are determined, and the lamps 18 on the racks storing the parts concerned light or flicker. Specifically, the number of lamps 18 in each rack which light or flicker corresponds to the quantities of the parts present (step 127).

Next, the parts supply operator takes out the necessary quantities of parts from the rack 8 where the lamps 18 light or flicker, places them in the port of parts delivery (step 128), and pushes the retrieving completion switches 19 at the rack position concerned (step 129). The parts supply operator repeatedly performs the above steps 128, 129 by each type of the parts, and after taking out all the parts necessary for the assembly from the rack 8, the parts supply operator pushes the operation finished switch 27 of the unit 17 (step 130). Then, by the processing at the steps 105 through 108 illustrated in FIG. 8, whether any parts failed to be retrieved in the retrieving unit 5 is judged, and the result is displayed on the screen of the display unit 26 of the unit 17. Watching the display unit 26, the parts supply operator confirms whether any parts failed to be retrieved (step 131); and when some parts failed to be retrieved, the parts supply operator repeatedly performs the steps 128 through 130 until all the parts necessary for the assembly are retrieved.

At this stage, the automated guided vehicle 7 that carries the retrieved parts has reached the relevant supply area A. Accordingly, when no parts failed to be retrieved, the control number written in the parts retrieving in-process card 9 set to the unit 17 is collated with the control number written in the carrying in-process card 10 set to the automated guided vehicle 7 (step 132). Here, if the control number written in the parts retrieving in-process card 9 is not equal to the control number written in the carrying in-process card 10, it will confirm that there occurs an order inconformity of the automated guided vehicle 7; therefore, an abnormal measure is taken (step 133). The abnormal measure, for example, is to find out the automated guided vehicle 7 to which is set the carrying in-process card 10 having the same control number written in as the parts retrieving in-process card 9, and to move the automated guided vehicle 7 to the relevant supply area A.

When the control number written in the parts retrieving in-process card 9 conforms to the control number written in the carrying in-process card 10, the parts supply operator mounts all the parts retrieved from the rack 8 on the automated guided vehicle 7 (step 134). Then, the parts supply operator takes out the parts retrieving in-process card 9 from the unit 17, and returns the parts retrieving in-process card 9 concerned to the in-process card storage place (step 135).

Then, as the parts supply operator pushes the start switch 32 of the automated guided vehicle 7, by the processing at the steps 115, 116 illustrated in FIG. 8, the automated guided vehicle 7 with the parts necessary for the assembly automatically moves from the supply area A to the assembly line B corresponding to the assembly line information (step 136). Thereafter, an operator who performs an operation on the assembly line B (hereafter, assembly operator) removes the parts from the automated guided vehicle 7 and carries the parts to a predetermined supply destination (step 137).

Next, the assembly operator takes out the carrying in-process card 10 from the automated guided vehicle 7 and returns the carrying in-process card 10 concerned to the in-process card storage place (step 138). Then, as the assembly operator pushes the start switch 32, the automated guided vehicle 7 without the parts mounted thereon automatically moves to the standby area C from the assembly line B (step 139).

In the above embodiment, the in-process card issuing machine 4 writes only the control number being the key information on a product into the parts retrieving in-process card 9; and the retrieving unit 5 reads out the control number information written in the parts retrieving in-process card 9, collates the control number information with the data registered in the databases 23, 24, and lights or flickers the lamps 18 on the racks where the parts corresponding to the control number are stored. Thereby, without writing lots of information such as the control number, vehicle type, parts, assembly line and parts rack location, etc. into the parts retrieving in-process card 9, an operator will find the types and quantities of the parts necessary for the assembly by the display of the lamps 18. Accordingly, the operator is able to remove the necessary parts from the rack 8.

The in-process card issuing machine 6 writes the information on the control number and the assembly line into the carrying in-process card 10, the automated guided vehicle 7 reads out the information on the control number and the assembly line written in the carrying in-process card 10, and the automated guided vehicle 7 is controlled to sequentially move to the supply area A and assembly line B corresponding to these information. Thereby, without writing lots of information into the carrying in-process card 10, the operation of the automated guided vehicle 7 can be controlled.

Thus, the above embodiment reduces the quantity of information written in the parts retrieving in-process card 9 and the carrying in-process card 10 to a minimum necessary level; therefore, in case of applying an IC chip 11, for example, to the recording means of the information written in the in-process cards 9, 10 (refer to FIG. 3A), the IC chip 11 of a small storage capacity can be used, which is advantageous in terms of cost. And in case of using the IC chip 11 of a comparably large storage capacity, it becomes possible to write not only the parts supply information, but also the other information; accordingly, performance management processing and process inventory management processing, for example, become possible with the same in-process card.

The retrieving processing of parts and the carrying processing of parts are linked and implemented in a bundle with the parts retrieving in-process card 9 and the carrying in-process card 10; therefore, this system is saved from synchronizing both processes, which is different from when both are implemented as independent systems and the whole system becomes compact. In addition, a system to control the whole process of the parts supply becomes unnecessary. Further, without a dedicated communication means separately from this system, this system can be implemented effectively. In addition, if there is a modification in the host system that supervises this system, this system is saved from the modification.

Further, when a model change occurs, using the parts retrieving in-process card 9 and the carrying in-process card 10, each containing minimal necessary information, will simplify the model changeover at the assembly facilities. Then, if an automated guided vehicle 7 fails, for example, to read the information written in the carrying in-process card 10 the card may be placed in another automated guided vehicle 7, which will complete the task. Here, it is not necessary to confirm which of the processes is completed. Further, if there is a layout change in the supply area A and the assembly line B and so forth, it is not necessary to modify the parts retrieving in-process card 9 and the carrying in-process card 10.

In addition, since the quantities of the parts retrieving in-process card 9 and the carrying in-process card 10 become equal to the number of the automated guided vehicles 7 operating on the assembly lines by controlling the control number, it becomes easy to control the quantities of the in-process cards 9, 10. Further, if a product comprising multiple specifications is produced in a mixed flow, it is not necessary to monitor the order of inputting parts, which is advantageous.

Although the present invention has been described with the above embodiment, it is not restricted to the embodiment. For example, the above embodiment describes the system wherein the automated guided vehicle 7 carries the parts retrieved from the rack 8 to the assembly line B; however a parts carrier may be a manned vehicle that an operator is needed to ride on. Then, the process of carrying parts from the supply area A to the assembly line B is not needed to be particularly systematized.

The above embodiment is provided with the retrieving unit 5 that lights the lamps 18 on the racks of the rack 8 where the necessary parts are stored; however, as a replacement for such a retrieving unit 5, it is conceivable to adopt a unit that displays or emits sounds as an indication to retrieve the requisite number of parts on the rack 8, or to install a unit that automatically takes out the necessary parts from the rack 8.

In the above embodiment, the controller 36 of the automated guided vehicle 7 controls the motor of the drive unit 30 thereby to control the start and stop of the automated guided vehicle 7 or the travel direction and speed of the automated guided vehicle 7; however, where the automated guided vehicle 7 incorporates a freight lift, the controller 36 may perform the elevation control of the lift or the freight uptake/due-out control and the like.

Further, the above embodiment is provided with a plurality of supply areas A; however, a system for a small production scale may use only one supply area A. In this case, the standby area C may be used also for the supply area A.

Figure 11:
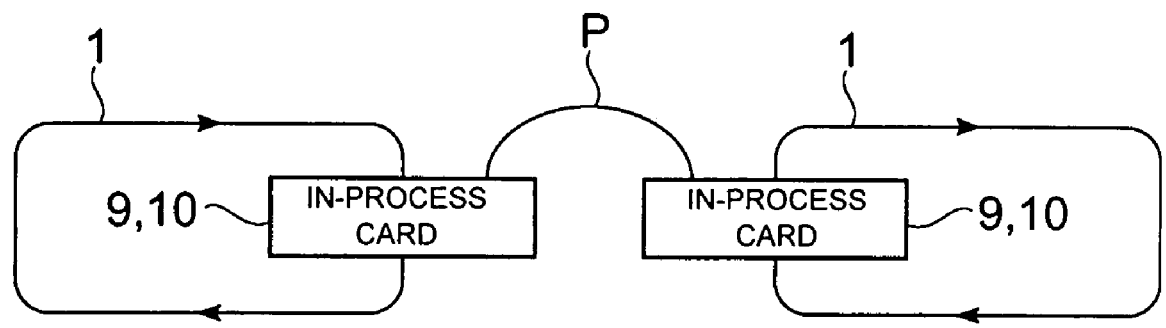
FIG. 11 is a schematic diagram illustrating a system formed by laying out two goods supply systems of FIG. 1 in parallel.

Further, it is conceivable to perceive the present goods supply system 1 to be one unit, and make up a system composed of plural units. As illustrated in FIG. 11, for example, to lay out two goods supply systems 1 in parallel and provide an information communication unit P that communicates the information written in the parts retrieving in-process card 9 and the carrying in-process card 10 between both the units will make the two goods supply systems 1 operate independently.

Figure 12:
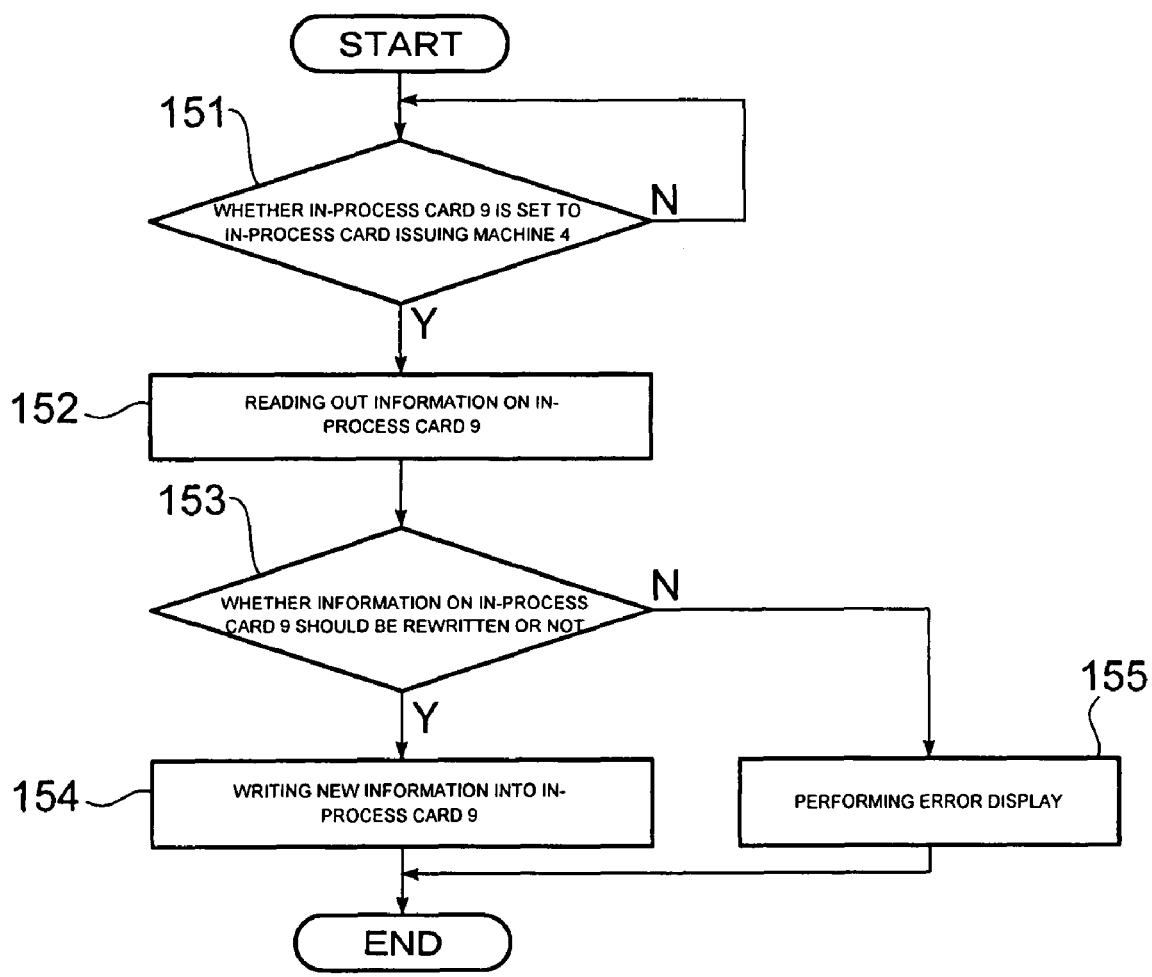
FIG. 12 is a flow chart illustrating one example of the information writing processing into the parts retrieving in-process card and the carrying in-process card of FIG. 1.

Further, in writing the identification information such as the control number, etc. into the parts retrieving in-process card 9 and the carrying in-process card 10, it is advisable to judge whether the information in the in-process cards 9, 10 should be rewritten or not. FIG. 12 illustrates one example of such information writing processing.

In FIG. 12, first, the step 151 judges whether the parts retrieving in-process card 9 is set to the in-process card issuing machine 4; and when the parts retrieving in-process card 9 is set, the step 152 reads out the identification information written in the parts retrieving in-process card 9. Then, the step 153 determines whether the identification information should be rewritten or not; when the identification information is determined to be rewritten, the step 154 writes new identification information into the parts retrieving in-process card 9 via the writing unit 15. When it is determined otherwise, the step 155 performs an error display on the display unit (not illustrated) of the in-process card issuing machine 4. Here, the step 155 may be omitted. The above embodiment omits the steps 152, 153, and 155. Then, the information writing processing into the carrying in-process card 10 can be performed by the same steps.

Figure 13:
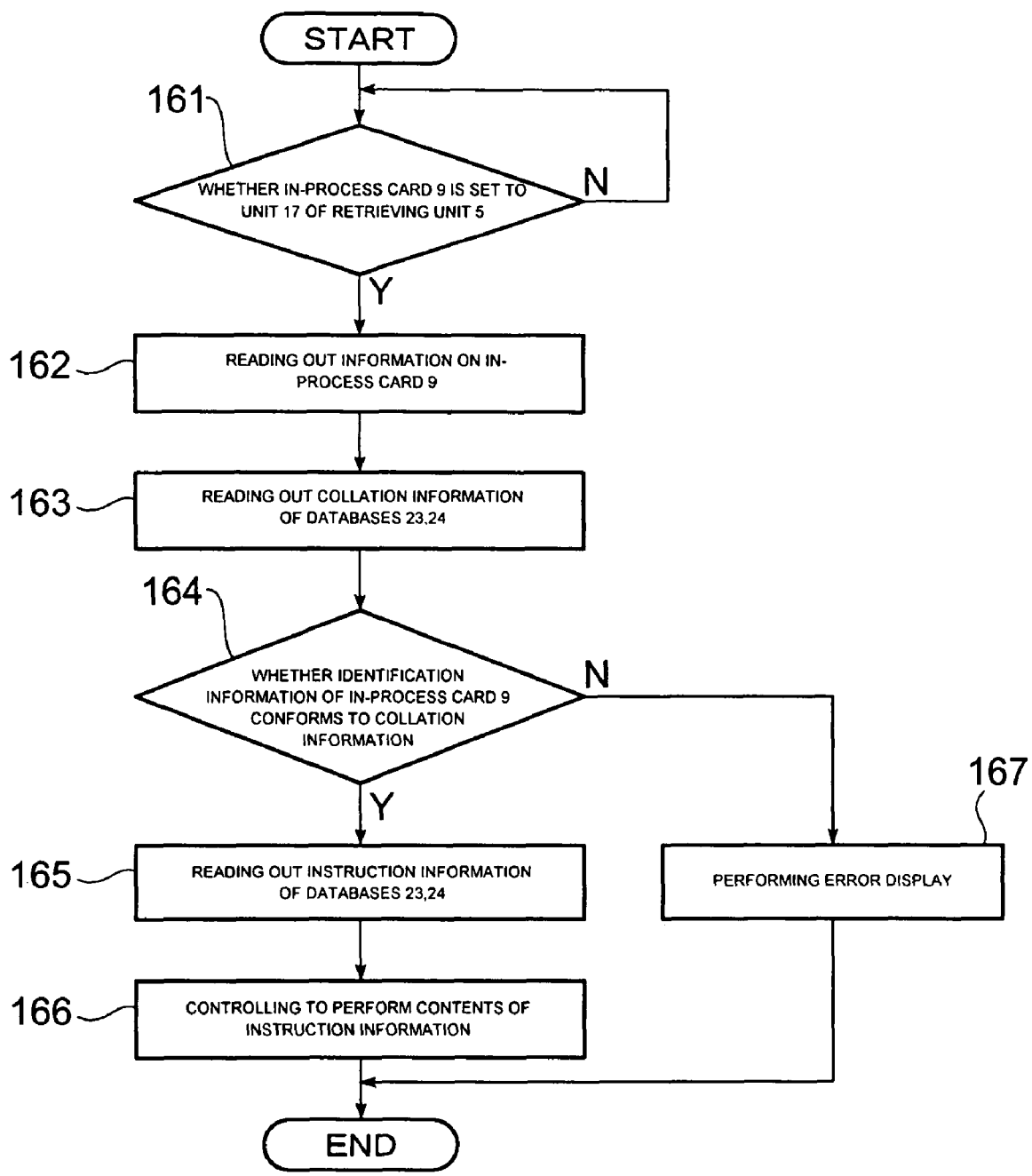
FIG. 13 is a flow chart illustrating one example of the parts retrieving control processing by the parts retrieving unit of FIG. 1.

In the above embodiment, the identification information written in the parts retrieving in-process card 9 is collated with the collation information registered in the databases 23, 24, the lamps 18 on the rack 8 are controlled to light or flicker in correspondence with the result of the collation; however, it is conceivable to register control contents (operation contents) corresponding to the collation result as instruction information in the databases 23, 24, and control the parts retrieving with the instruction information concerned. FIG. 13 illustrates one example of such parts retrieving control processing.

In FIG. 13, first, the step 161 judges whether the parts retrieving in-process card 9 is set to the unit 17 of the retrieving unit 5; and when the parts retrieving in-process card 9 is set, the step 162 reads out the identification information written in the parts retrieving in-process card 9. Next, the step 163 reads out the collation information registered in the databases 23, 24. The step 164 collates whether the identification information conforms to the collation information; and when the identification information conforms to the collation information, the step 165 reads out the instruction information registered in the databases 23, 24, and the step 166 controls to perform the contents of the instruction information concerned. Here, if the contents of the instruction information concerned are to light or flicker the lamps 18 on the rack 8, the step 166 controls the lamp driving unit 25 to light or flicker the lamps 18 on the racks where the parts corresponding to the identification information are stored. If otherwise, on the other hand, the step 167 gives an error display on the display unit 26 of the unit 17. Here, the order of the steps 162, 163 may be reversed. The step 165 may be executed prior to the step 164. Further, the step 167 may be omitted.

The goods supply system 1 of the above embodiment is a system that supplies parts for making up a product from the supply area A to the assembly line B in a factory; however, the present invention is applicable to the supply of commodities in shopping centers and markets, or to the supply of products in distribution warehouses, in addition to the supply of parts for making up a product.

In this case, commodities or products are stored in the rack 8. Then, the commodities or products retrieved from the rack 8 are carried to a predetermined carriage destination from the supply area by the carrier. As the information written in the in-process cards 9, 10, the following information can be listed: control number, supply area, carriage destination (such as selling space), number of times of writing, card ID, etc.

Therefore, the present examples and embodiments are to be considered as illustrative and not restrictive, and the invention is not to be limited to the details given herein but may be modified within the scope of the appended claims.

The present invention relates to a goods supply system that retrieves parts for making up a product from goods storage locations in a supply area and supplies them to an assembly line, which includes: a storage means that registers key information on the product and parts information including information on types and storage locations of the parts in advance; a first in-process card issuing machine that writes the key information on the product into a first in-process card; and a retrieving unit having a means that reads out the key information written in the first in-process card, collates the key information concerned with the key information and the parts information registered in the storage means, and retrieves the parts corresponding to the key information from the goods storage locations. Here, the "parts for making up a product" are not confined to parts to be assembled into a product, but they include jigs and the like, which are not assembled into a product.

In performing an operation to supply the parts for making up a product to the assembly line with the above goods supply system of the invention, in the first place, the first in-process card issuing machine writes the key information on the product into the first in-process card. Next, the retrieving unit reads out the key information written in the first in-process card, collates this key information with the key information and the parts information registered in the storage means, and controls to retrieve the parts corresponding to the key information from the goods storage locations. Then, after retrieving the parts corresponding to the key information from the goods storage locations, the system conveys the parts concerned to the assembly line. Thus in the present invention, it is not necessary to write a lot of information required for supplying the parts into the first in-process card as the operation instruction information, but it is only needed to write the key information on the product into the first in-process card. Thus, the system is capable of supplying the parts necessary to the assembly line, while minimizing the information quantity to be written in the first in-process card (information recording medium).

It is preferable to further include: a second in-process card issuing machine that writes the key information and assembly line information on the product into a second in-process card; a carrier that carries the parts retrieved from the goods storage locations to the assembly line; a carrier control means that reads out the key information and assembly line information written in the second in-process card, and when the key information written in the first in-process card conforms to the key information written in the second in-process card, moves the carrier to the assembly line corresponding to the assembly line information.

In performing an operation to supply the parts with the above goods supply system, in addition to the above operation, the second in-process card issuing machine writes the key information and assembly area information on the product into the second in-process card, and the carrier control means reads out the key information and assembly area information. Then, when the key information written in the first in-process card conforms to the key information written in the second in-process card, the parts retrieved from the goods storage locations are mounted on the carrier. Thereafter, the carrier control means moves the carrier to an assembly area corresponding to the assembly area information. In this case, not only the control of retrieving the parts is possible, but also the control of carrying the parts by the carrier is possible with the second in-process card wherein only the key information and assembly area information on the product are written. Further, the system can bundle the process of retrieving parts and the process of carrying parts together by using the first in-process card and the second in-process card; thereby, it becomes possible to shrink the system.

Here, it is preferable that the system has plural supply areas, the first in-process card issuing machine and the retrieving unit are located in each of the supply areas, and the carrier control means includes: a means that reads out the key information and assembly line information written in the second in-process card, and moves the carrier to the supply area having the goods storage locations wherein the parts corresponding to the assembly line information are stored, and a means that moves the carrier to the assembly line corresponding to the assembly line information, when the key information written in the first in-process card conforms to the key information written in the second in-process card.

When there are multiple models of a product, the types of parts increases, and there can be a case that multiple supply areas become necessary. Now, in order to perform the supply operation of the parts, the carrier must have in the supply area the goods storage locations that store the parts corresponding to a model to be manufactured. Therefore, first, the carrier control means reads out the key information and assembly line information written in the second in-process card, and moves the carrier to the supply area having the goods storage locations that store the parts corresponding to the assembly line information. Thereby, if there are multiple supply areas, it is possible to supply the parts necessary for the assembly of a product to the assembly line from the goods storage locations.

It is also preferable that the carrier is an automated guided vehicle that automatically moves along a travel course, and the carrier control means moves the automated guided vehicle according to the instruction of traveling the automated guided vehicle by a start instruction means. Thus, by applying an automated guided vehicle to the carrier, an operator need not ride the carrier; thereby, it is possible to reduce personnel involved in the supply operation of parts.

It is also preferable that both the key information written in the first in-process card and the key information and assembly area information written in the second in-process card are rewritable. Thereby, it becomes possible to reuse the first in-process card and the second in-process card, which saves an unnecessary waste of resources.

The present invention relates to a goods supply system that retrieves goods from goods storage locations in a supply area and supplies them to a carriage destination, which includes: a storage means that registers key information on the goods and goods information including information on types and storage locations of the goods in advance; a first in-process card issuing machine that writes the key information on the goods into a first rewritable in-process card; a second in-process card issuing machine that writes the key information and carriage destination information on the goods into a second rewritable in-process card; a retrieving unit having a means that reads out the key information written in the first in-process card, collates the key information concerned with the key information and the goods information registered in the storage means, and controls to retrieve the goods corresponding to the key information from the goods storage locations; a carrier that carries the goods retrieved from the goods storage locations to the carriage destination; and a carrier control means that reads out the key information and the carriage destination information written in the second in-process card, and when the key information written in the first in-process card conforms to the key information written in the second in-process card, moves the carrier to the carriage destination corresponding to the carriage destination information.

In performing an operation to supply the goods to the carriage destination with the above goods supply system of the invention, in the first place, the first in-process card issuing machine writes the key information on the goods into the first in-process card. Next, the retrieving unit reads out the key information written in the first in-process card, collates this key information with the key information and information on the goods registered in the storage means, and controls to retrieve the goods corresponding to the key information from the goods storage locations. Then, the second in-process card issuing machine writes the key information and carriage destination information on the goods into the second in-process card, and the carrier control means reads out the key information and carriage destination information concerned. Then, when the key information written in the first in-process card conforms to the key information written in the second in-process card, the goods retrieved from the goods storage locations (goods corresponding to the key information) are mounted on the carrier. Thereafter, the carrier control means moves the carrier to the carriage destination corresponding to the carriage destination information. Thus in the present invention, it is not necessary to write a lot of information required for supplying the goods into the first in-process card and the second in-process card as the operation instruction information, but it is only needed to write the key information on the goods into the first in-process card, and to write the key information and the carriage destination information on the goods into the second in-process card. Thus, the system is capable of supplying necessary goods to the carriage destination, while restraining the information quantity to be written in the first in-process card and the second in-process card (information recording medium) to a minimum.

Further, the system can bundle the process of retrieving the goods and the process of carrying the goods together by using the first in-process card and the second in-process card; thereby, it becomes possible to shrink the system. Further, since the information written in the first in-process card and the second in-process card are rewritable, it becomes possible to reuse the first in-process card and the second in-process card, which saves an unnecessary waste of resources.

What is claimed is:

1. A goods supply system that retrieves parts for making up a product from goods storage locations in a supply area and supplies them to an assembly line, comprising:
    a storage means that registers key information on the product and parts information including information on types and storage locations of the parts in advance;
    a first in-process card issuing machine that writes the key information on the product into a first in-process card;
    a second in-process card issuing machine that writes the key information and assembly line information on the product into a second in-process card;
    a retrieving unit having a means that reads out the key information written in the first in-process card, collates the key information with the key information and the parts information registered in the storage means, and retrieves the parts corresponding to the key information from the goods storage locations;
    a carrier that carries the parts retrieved from the goods storage locations to the assembly line; and
    a carrier control means that reads out the key information and assembly line information written in the second in-process card, and when the key information written in the first in-process card conforms to the key information written in the second in-process card, moves the carrier to the assembly line corresponding to the assembly line information.

2. The goods supply system according to claim 1, wherein the system has at least two supply areas, wherein the first in-process card issuing machine and the retrieving unit are located in each of the supply areas, wherein the carrier control means comprises: a means that reads out the key information and assembly line information written in the second in-process card, and moves the carrier to the supply area having the goods storage locations wherein the parts corresponding to the assembly line information are stored; and a means that moves the carrier to the assembly line corresponding to the assembly line information, when the key information written in the first in-process card conforms to the key information written in the second in-process card.

3. The goods supply system according to claim 1, wherein the carrier is an automated guided vehicle that automatically moves along a travel course, and wherein the carrier control means moves the automated guided vehicle according to the instruction of traveling the automated guided vehicle by a start instruction means.

4. The goods supply system according to claim 1, wherein both the key information written in the first in-process card and the key information and assembly line information written in the second in-process card are rewritable.

5. The goods supply system according to claim 1, wherein the assembly line is provided in plurality and the assembly line information identifies one of the assembly lines.

6. A goods supply system that retrieves goods from goods storage locations in a supply area and supplies them to a carriage destination, comprising:
    a storage means that registers key information on the goods and goods information including information on types and storage locations of the goods in advance;
    a first in-process card issuing machine that writes the key information on the goods into a first rewritable in-process card;
    a second in-process card issuing machine that writes the key information and carriage destination information on the goods into a second rewritable in-process card;
    a retrieving unit having a means that reads out the key information written in the first in-process card, collates the key information with the key information and the goods information registered in the storage means, and retrieves the goods corresponding to the key information from the goods storage locations;
    a carrier that carries the goods retrieved from the goods storage locations to the carriage destination; and
    a carrier control means that reads out the key information and the carriage destination information written in the second in-process card, and when the key information written in the first in-process card conforms to the key information written in the second in-process card, moves the carrier to the carriage destination corresponding to the carriage destination information.

* * * * *